Feb. 12, 1935. N. E. METHLIN 1,990,951
WHEELED GUN CARRIAGE
Filed Dec. 5, 1932 13 Sheets-Sheet 1
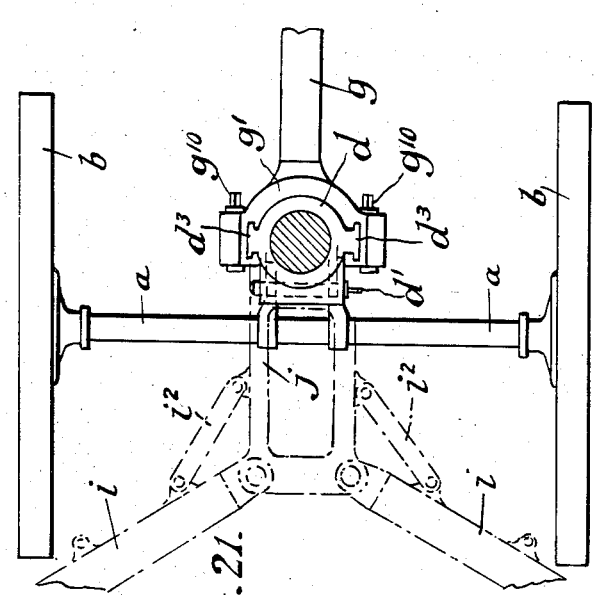
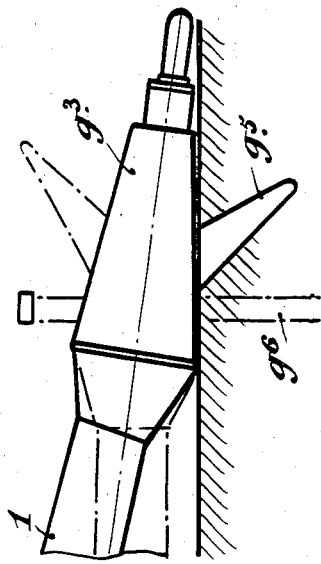
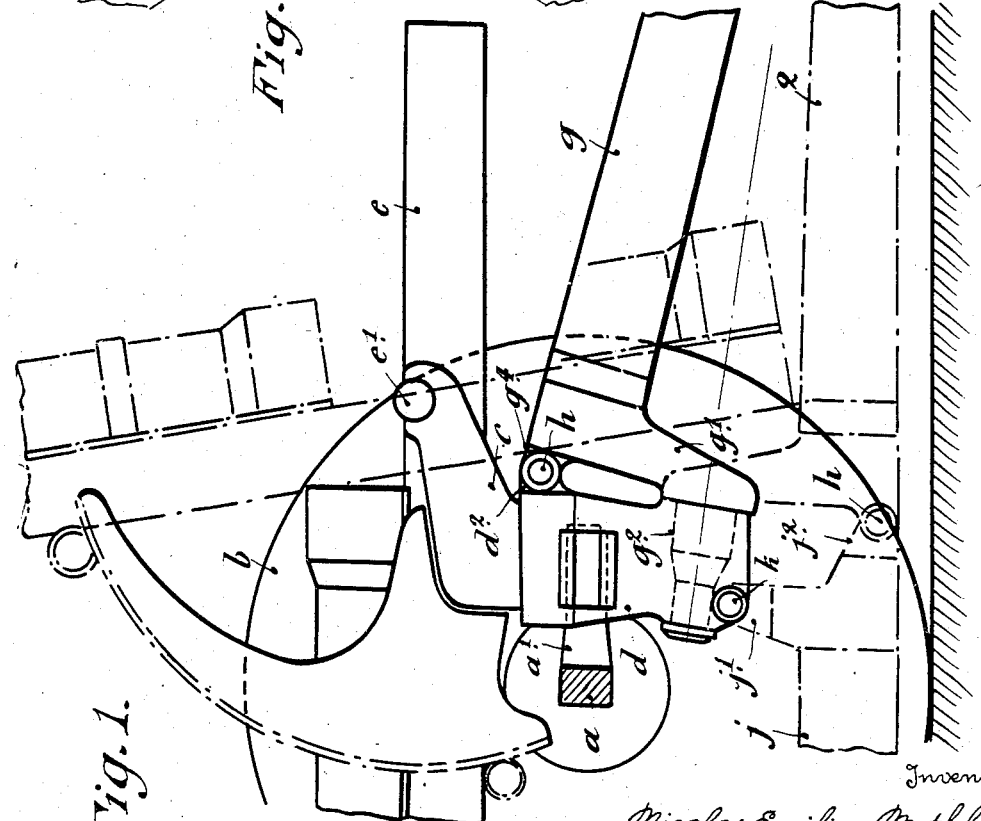
Inventor
Nicolas Emilien Methlin
By Cameron, Kerkam & Sutton
Attorneys

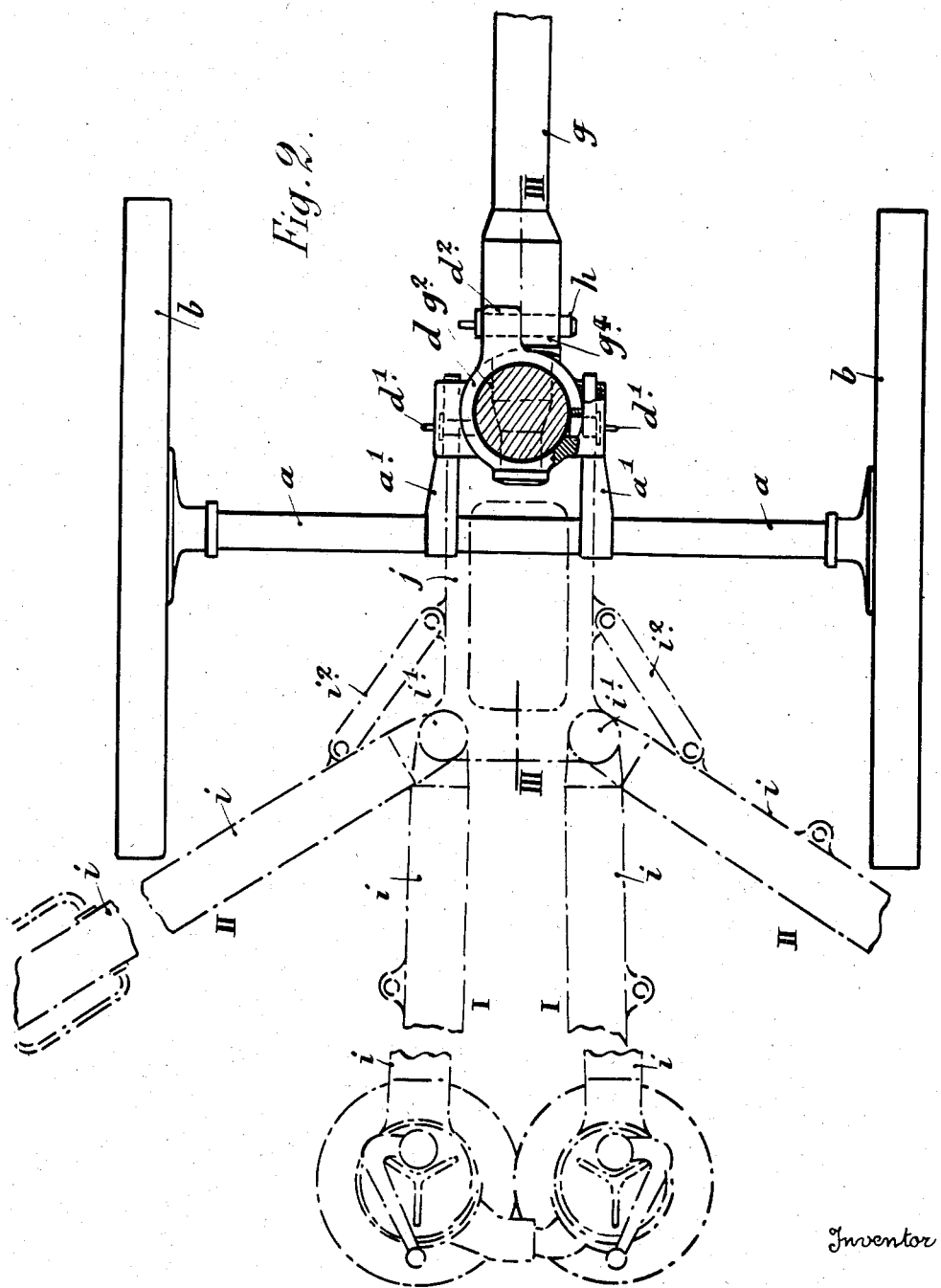

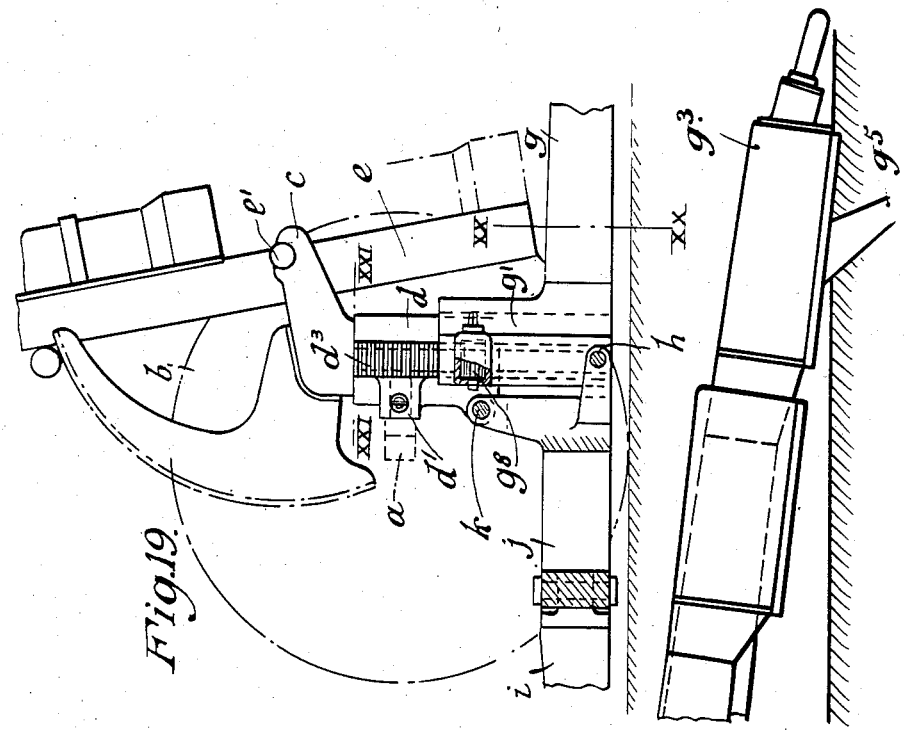

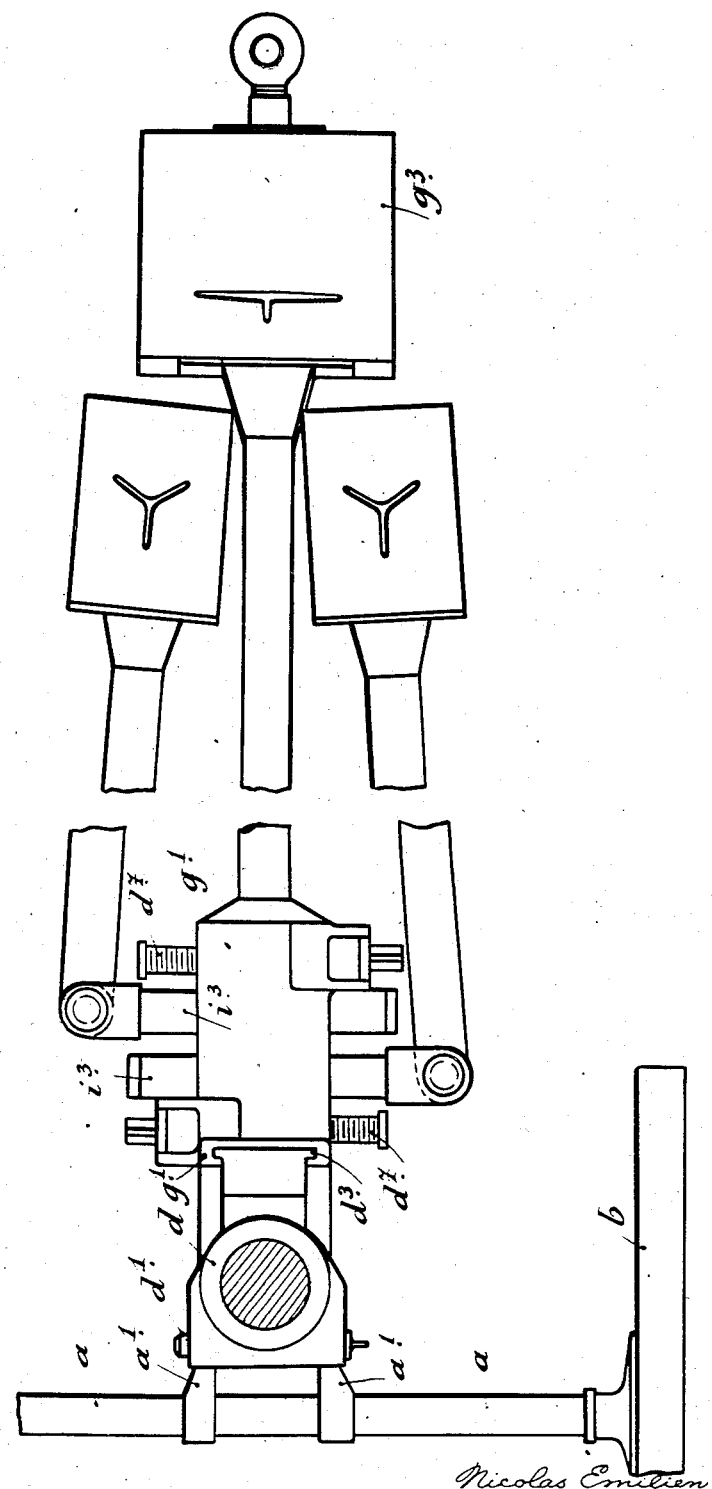

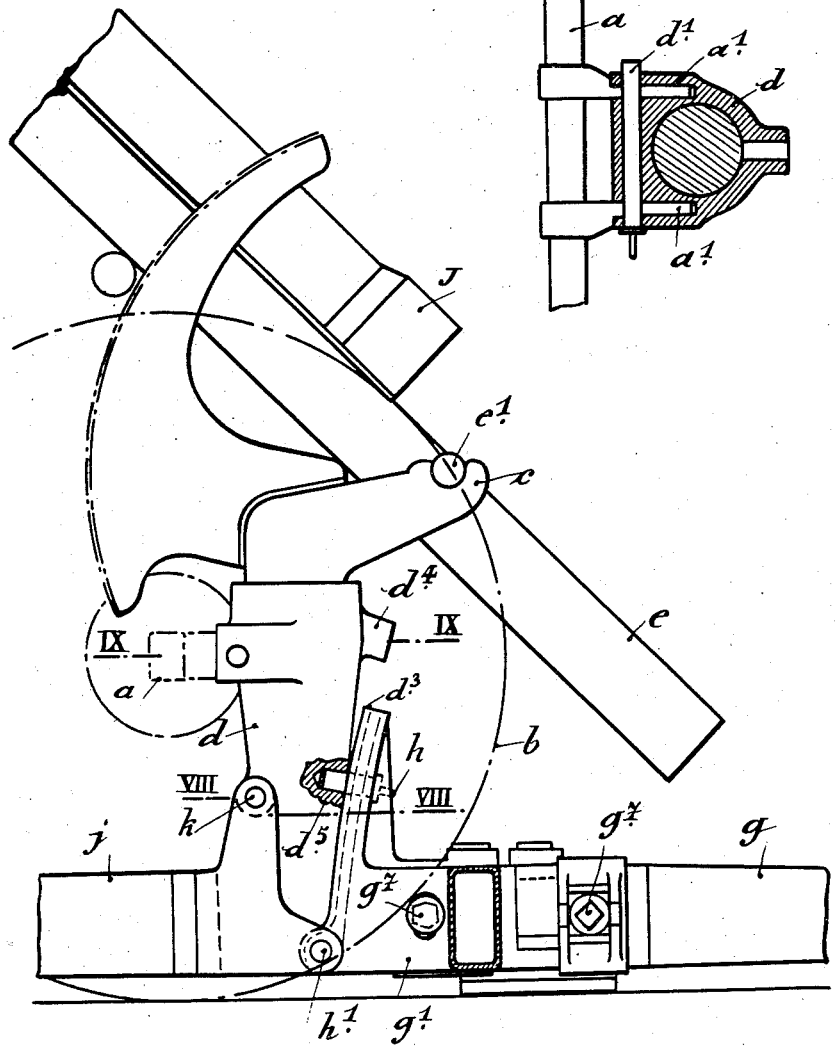

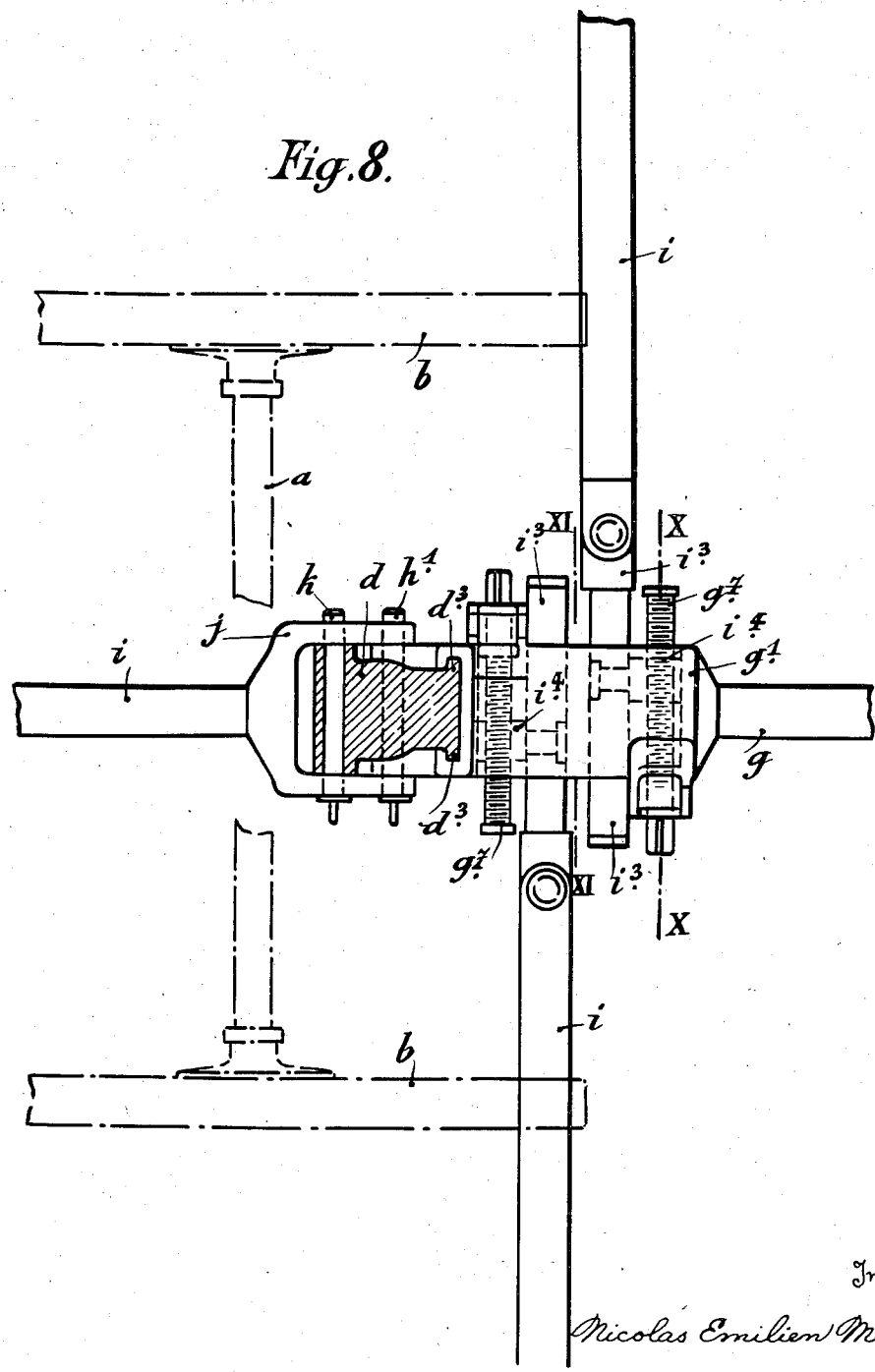

Feb. 12, 1935.    N. E. METHLIN    1,990,951
WHEELED GUN CARRIAGE
Filed Dec. 5, 1932    13 Sheets-Sheet 9

Feb. 12, 1935. N. E. METHLIN 1,990,951
WHEELED GUN CARRIAGE
Filed Dec. 5, 1932  13 Sheets-Sheet 10
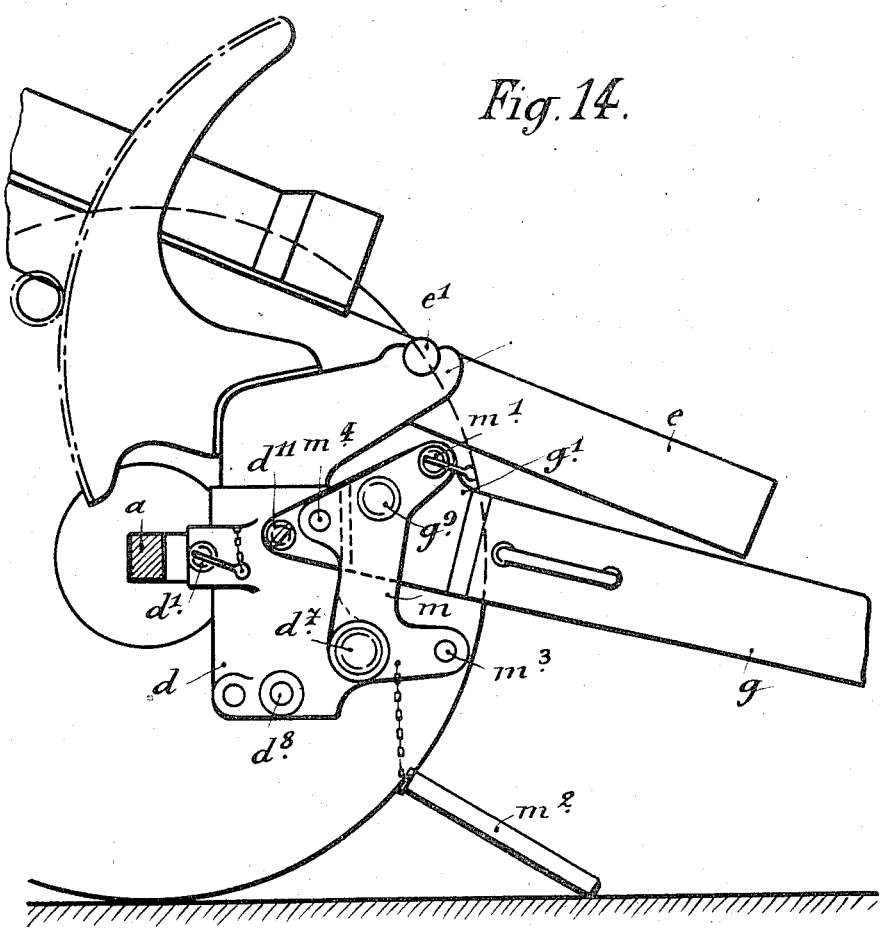
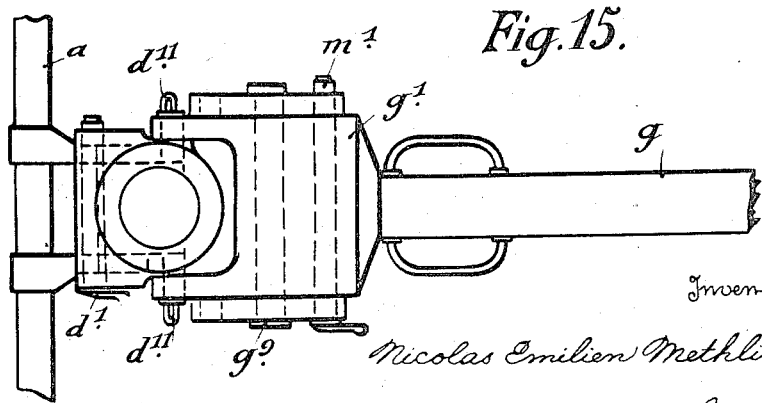

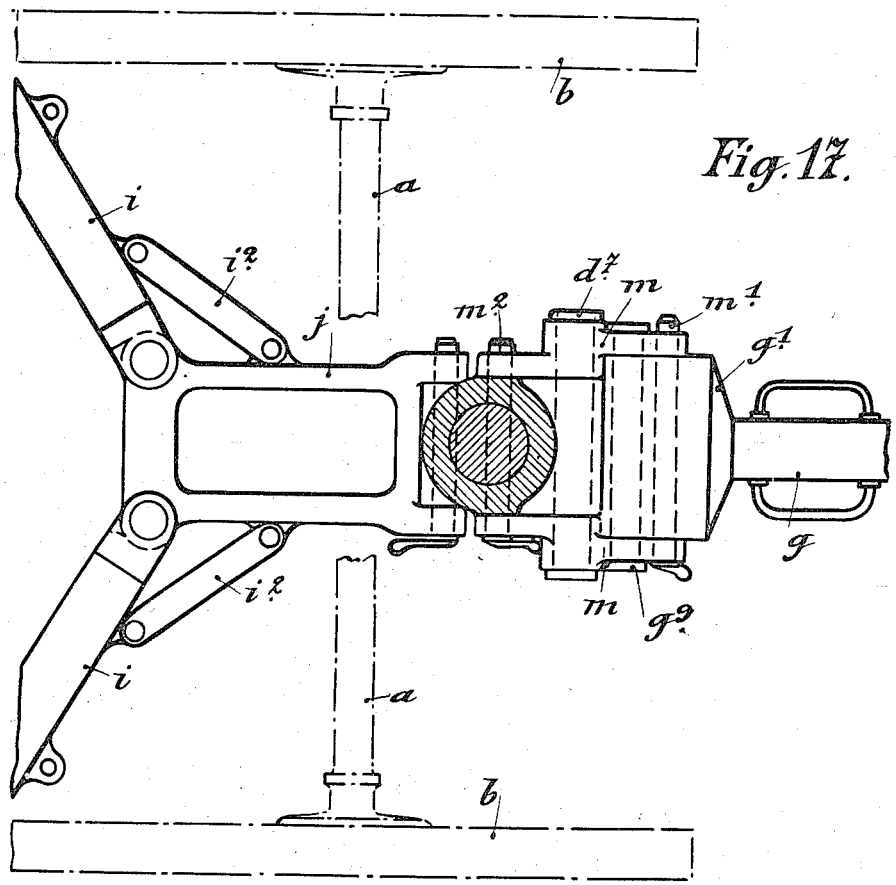
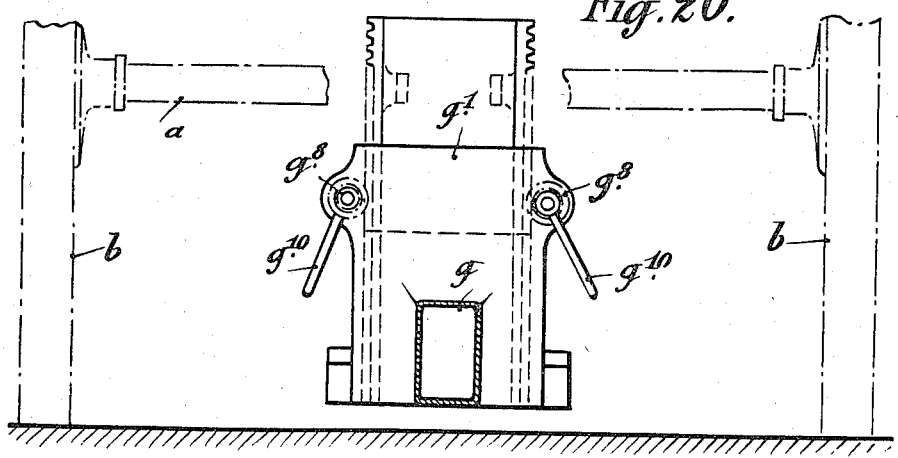

Patented Feb. 12, 1935

1,990,951

UNITED STATES PATENT OFFICE 1,990,951

WHEELED GUN CARRIAGE

Nicolas Emilien Methlin, Paris, France, assignor to Schneider & Cie, Paris, France, a company of France Application December 5, 1932, Serial No. 645,828
In France February 25, 1932

18 Claims. (Cl. 89—40)

In my application for U. S. Letters Patent filed on June 30, 1932 (Serial Number 620,272), for "Improvements in wheeled gun carriages", there is described and represented a wheeled gun carriage of the split trail type which, with or without the aid of one or more auxiliary trails, is adapted to be rapidly converted into an antiaircraft gun carriage. The equipment for firing on wheels thus has a horizontal field of fire which is fairly wide but is limited to the angle of spread between the two legs of the main trail, and a considerable vertical field of fire, due to the space left free between the two legs of the split trail. When converted by lowering the legs of the split trail and removing the wheels or the set of wheels, as well as by adding one or more auxiliary trails, the equipment has a horizontal field of fire enabling a complete turn of the horizon to be made. In addition, the vertical field of fire is sufficiently high for firing against aerial objectives.

It was pointed out in that prior application that conversion was rendered possible by the fact that the legs of the split trail were so adapted that the said trail legs could be brought, even simultaneously, either by individual or coupled action, alternatively into a position with the head raised, in which the system of the said trail legs is arranged for travelling or for normal firing on wheels, or into a position with the head lowered, in which position the oscillating gun and cradle, during the movement of the top carriage in its pintle bearing, is able to pass over the system of trail legs, however high the angle of elevation.

It has now been found that the principle underlying this convection of an equipment on wheels into an anti-aircraft equipment adapted to traverse the entire horizon, may be applied to wheeled equipments of the single-trail type, on condition of course that the trail proper, provided with the normal anchoring spade and with or without the normal coupling trail eye, has associated with it a suitable number of supports or auxiliary trails.

The present invention has for its object to provide single-trail wheeled equipments adapted to be converted in this manner by the application of the principle utilized for the conversion of wheeled equipment with split trail according to the aforesaid prior application.

As in the equipment disclosed in the aforesaid prior application, the conversion is effected by lowering the single main trail, the means for effecting such lowering being, moreover, somewhat similar to those previously indicated for effecting the individual lowering of each of the legs of the split trail systems in the equipments according to the said prior application.

However, since the present invention is concerned with single-trail rather than split trail equipment, another object is to provide new and improved means for associating therewith the necessary plurality of auxiliary trails when the gun is in position for anti-aircraft firing.

These and other objects will appear more fully from a consideration of the detailed description of the invention which follows.

Various constructional examples of a convertible single-trail equipment according to the invention are represented in the accompanying drawings, wherein:—

Figure 1 shows in side sectional elevation a convertible single-trail equipment, comprising in addition to the normal or main trail for firing on wheels and for limbering up, two auxiliary trails for the converted equipment, one of the auxiliary trails and the normal or main trail in its bottom position being shown in dot-and-dash lines, while the single trail for normal firing on wheels is shown in full lines;

Figure 2 is a corresponding plan;

Figure 5 is a side sectional elevation of another construction showing the convertible equipment in a position for firing on wheels with the main trail anchored to the ground, and two auxiliary trails not being used and closed up against the main trail;

Figure 6 is a corresponding part plan view, the top carriage and the oscillating cradle and gun being supposed to have been removed;

Figure 7 shows in sectional elevation the converted equipment put in battery position for the operations of firing against aircraft, the set of wheels which have been removed, being shown in dot-and-dash lines;

Figure 8 is a sectional plan taken along the line VIII—VIII in Figure 7;

Figure 9 is a view taken along the line IX—IX in Figure 7;

Figure 16:
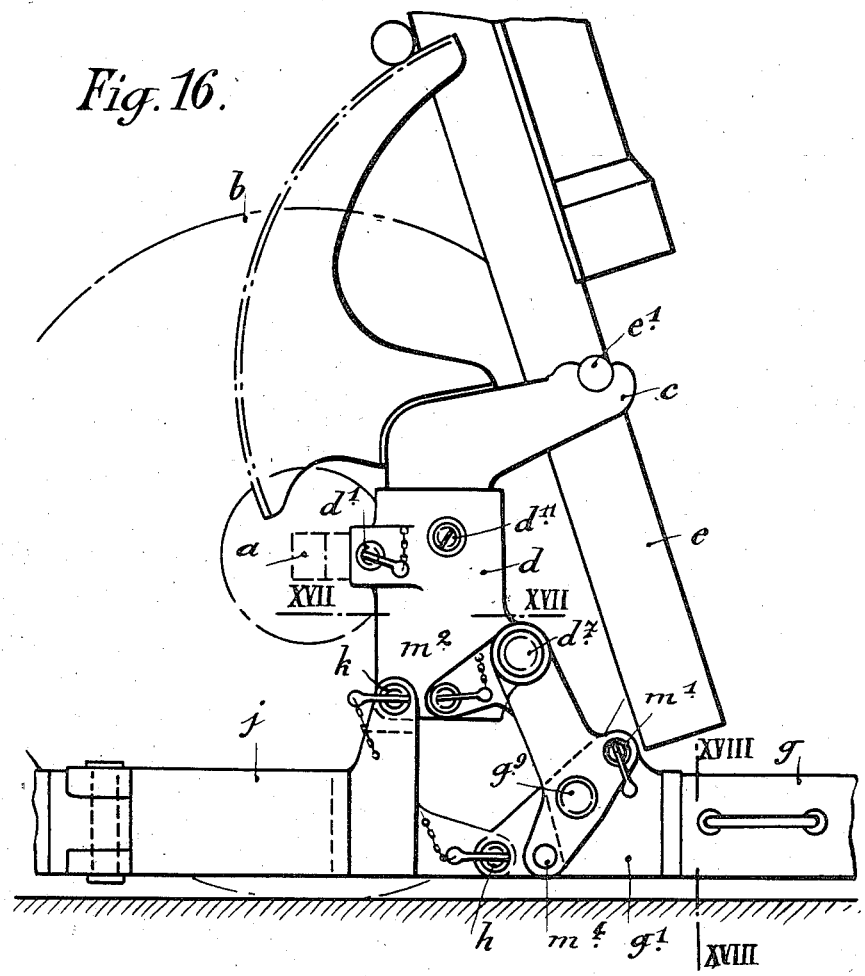
Figure 18:
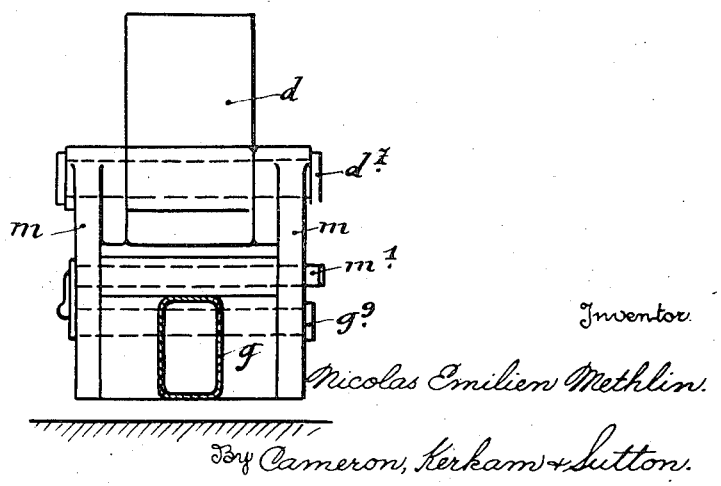

Figures 14 to 18, inclusive, represent another construction. Figure 14 is an elevation of the convertible equipment in a position for firing on wheels. Figure 15 is a corresponding part plan, the oscillating gun and cradle and the top carriage being supposed to have been removed. Figure 16 is an elevation showing the equipment in battery position and converted for firing against aerial objectives. Figure 17 is a corresponding part sectional plan, the section being taken along the line XVII—XVII in Figure 16. Figure 18 is a part section taken along the line XVIII—XVIII in Figure 16.

Figure 19:
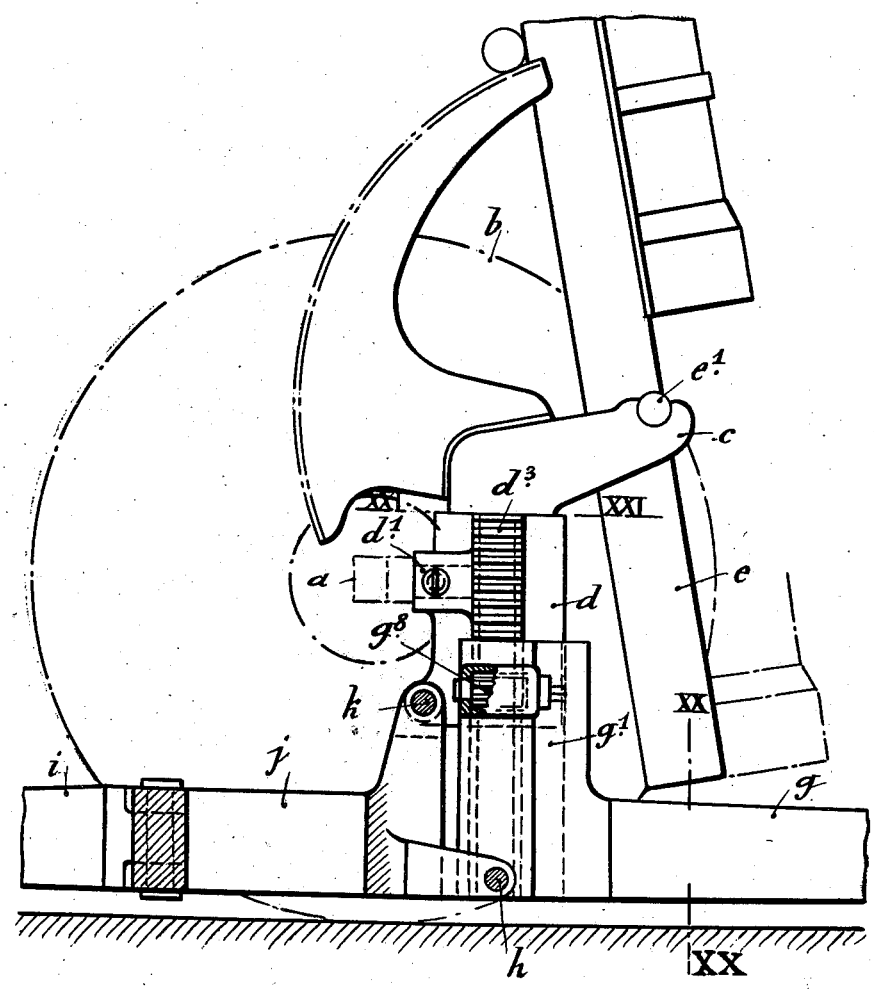

Figures 19 to 21 show a modification of the connecting device between the head of the main trail which is adapted to be lowered, and the pintle bearing carried by the axle, Figure 19 being a part sectional elevation of the converted equipment in battery position, while Figures 20 and 21 are sections taken respectively along the lines XX—XX and XXI—XXI in Figure 19.

The wheeled, single-trail equipment, represented in these various figures, comprises in known manner a set of wheels (axle $a$ and wheels $b$, $b$), of which the axle $a$ carries a carriage head which may be constituted by arms $a^1$, carrying in their turn a pintle bearing $d$ serving as pedestal for a top carriage $c$ in which the cradle $e$ is adapted to be displaced for elevating movements by means of the trunnions $e^1$, the gun $f$ being adapted to recoil in the said cradle. With a view to converting the equipment, provision is made for the possibility of separating the arms $a^1$ from the pintle bearing $d$, in which the said arms fit, the coupling between the said arms and the pintle bearing being normally ensured, for example, by means of locking bolts $d^1$ passing through eyes in the arms $a^1$ and fitting in recesses provided in the pintle bearing $d$. The usual normal main trail $g$ is adapted to be displaced, by rotation, sliding or any other form of displacement, relative to the pintle bearing $d$, permitting the said trail to be brought alternatively into a raised position for firing on wheels or for travelling, and into a lowered position for the conversion of the wheeled equipment into an equipment for firing against aerial objectives.

The various forms of construction represented in the drawings mainly differ in the form of construction of the coupling or association between the trail adapted to be lowered and the pintle bearing in which the top carriage pivots. These forms of construction differ in a subordinate manner in the means provided for attaching auxiliary trails to the convertible equipment, the said auxiliary trails being indispensable for the equipment converted for firing against aerial objectives.

In the example shown in Figures 1 to 4 inclusive, the main trail $g$, or the trail proper, comprises a head $g^1$ in the form of a projection below the trail body, considered in the position it occupies on the non-converted equipment (full line view in Figure 1). The said head carries projecting from it a trunnion $g^2$ for which a seat is provided in the pintle bearing $d$, the geometrical axis of the said trunnion coinciding with the geometrical axis of the trail foot $g^3$ which is adapted to pivot relatively to the trail body $g$. The trail head $g^1$ in addition carries a lug $g^4$ which in the normal raised trail position for firing on wheels or for travelling, is coupled to the pintle bearing $d$ provided with a corresponding lug $d^2$, such coupling being effected by means of a detachable pin $h$.

The equipment thus constituted may be employed for firing on wheels and for being placed in the battery position indicated in full lines in Figure 1, the anchoring of the trail foot being effected, for example, by means of an ordinary short trail foot spade $g^5$ and if desired by means of a sliding spade, this being chiefly necessary for firing with the equipment converted.

In order to convert the equipment, the trail is lowered by rotating it to bring it from the full line position 1 into the dot-and-dash position 2 shown on the same figure. For this purpose, it is necessary, of course, to withdraw the pin $h$ beforehand, the said pin being retained in any suitable point, for example on the trail head by means of a short chain. The trail $g$ having been brought into the position 2, the supports or auxiliary trails $i$ which may be hinged at $i^1$ to a common head $j$, are placed in position. The head $j$ is provided with projections or lugs $j^1$ and $j^2$ for attaching it to the pintle bearing $d$ and to the trail head $g^1$, respectively, by means of pins $k$ and $h$.

Figure 3:
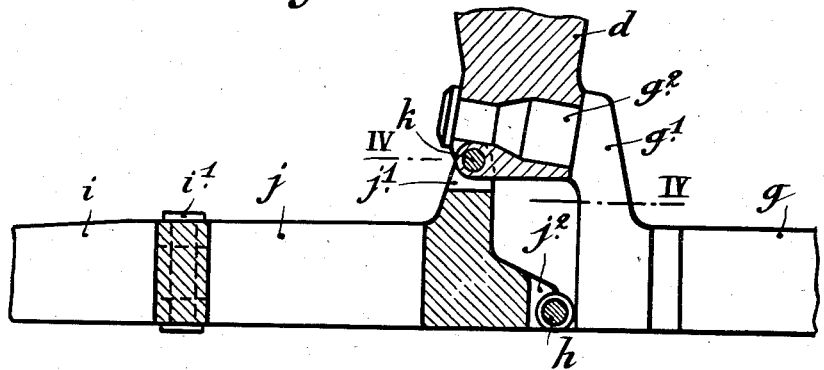
Figure 3 is a part sectional elevation taken along the line III—III in Figure 2.
Figure 4:
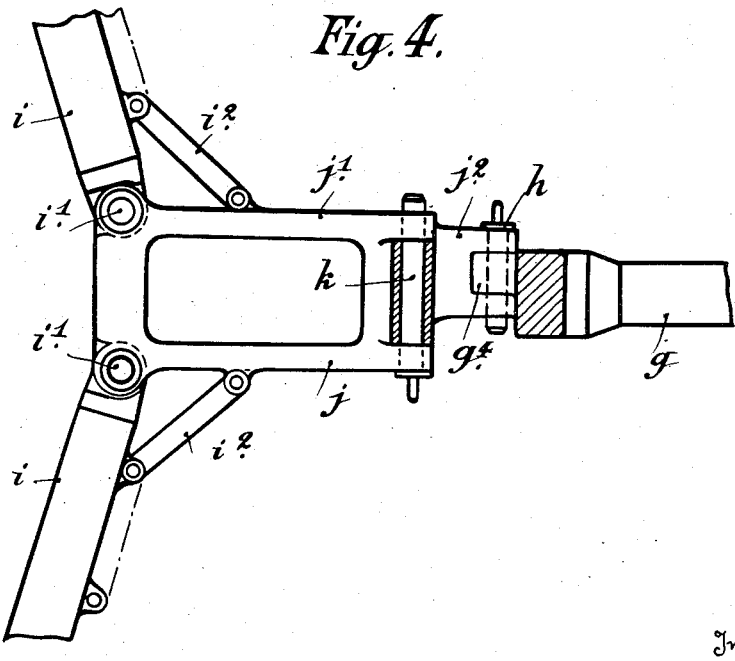
Figure 4 is a sectional plan taken along the line IV—IV in Figure 3.
Figure 11:
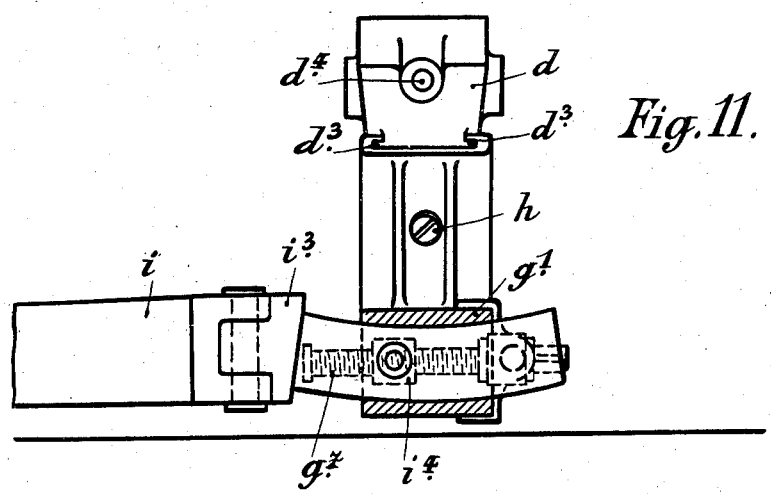
Figure 11 is a part elevation taken along the line XI—XI in Figure 8.
Figure 10:
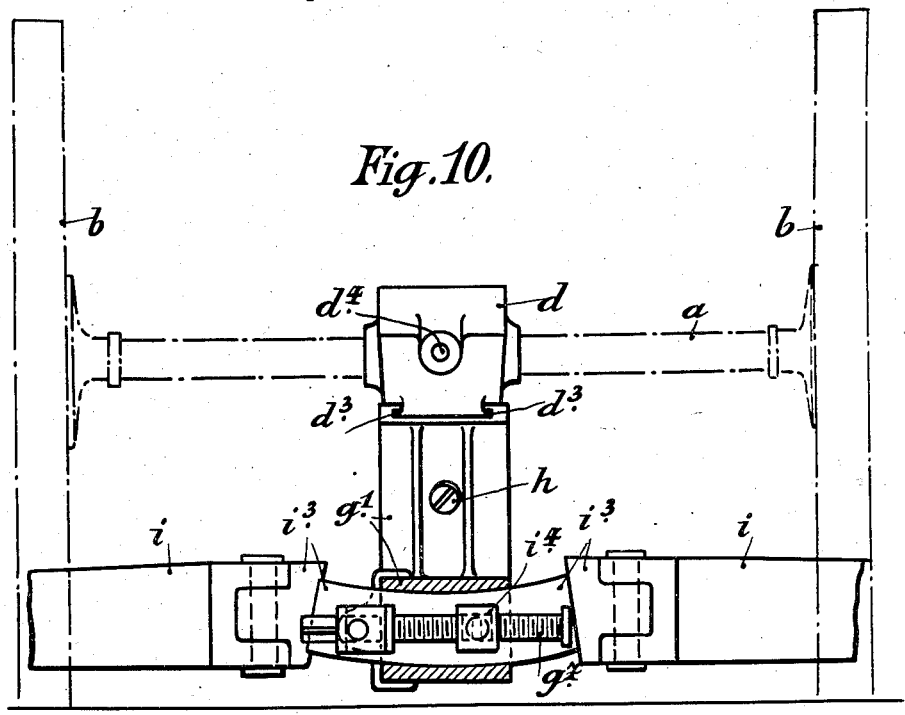
Figure 10 is a sectional elevation taken along the line X—X in Figure 8.

The supports $i$ which were brought together for travelling (position I in Figure 2) are then spread apart into the position II and attached by ties $i^2$ to the head $j$ placed in position, as shown in full lines in Figure 4 and in dot-and-dash lines in Figure 2. It is now merely necessary to remove the set of wheels which, after withdrawal of the bolts $d^1$, are rolled away, the wheels passing over the supports $i$. The equipment is thus prepared for firing against aerial objectives. Figure 1 shows that the oscillating gun and cradle is able, in all aiming positions of the field of fire of 360°, to pass over the main trail $g$ and the auxiliary trails or supports $i$.

For the transport of the equipment, the reverse operations to those which have just been described are carried out. The set of wheels is replaced, the auxiliary trails $i$ are brought together, the ties $i^2$ being folded on them, the head $j$ is disengaged after withdrawing the pins $k$ and $h$ and then the main trail $g$ is raised by rotation, the pin $h$ being replaced in the full-line position it occupies in Figure 1. Of course, during this operation of raising the trail $g$, the equipment must be kept in equilibrium about the axle, as was necessary during the operation of lowering the trail, by lowering the chase of the gun or the front part of the cradle.

The auxiliary trails, like the main trail, may be anchored by means of sliding spades, a recess being provided for the latter, in the usual manner, as regards the auxiliary trails, in lifting jacks, as shown in Figures 1 and 2. The whole of the auxiliary trails $i$ and the coupling head $j$ are transported separately.

In the construction represented in Figures 5 to 11, the main trail $g$, in order to allow it to be lowered, comprises a head $g^1$ of C-shaped cross-section constituting a slide block movable on guides $d^3$ in the form of projections on the pintle bearing $d$. The said guides, like the slideways in the trail head, are of course arcuate and have their centre in the vicinity of the trail foot (Figure 5). In the position for firing on wheels, that is to say, in the top position of the head $g^1$, as shown in Figure 5, the said head is fixed to a pintle bearing $d$ by means of a pin $h$ engaging a corresponding recess provided in a projection $d^4$ on the said pintle bearing.

In order to lower the trail $g$ with a view to converting the equipment, the pin $h$ is disengaged, the head $g^1$ is allowed to slide on the guides or ribs $d^3$ and the trail $g$ is fixed by means of the same pin $h$ which is inserted in a second recess $d^5$ provided in the lower part of the pintle bearing $d$ (Figure 7).

This constructional form also differs from the preceding construction by the arrangement of the auxiliary trails and the head $g^1$.

As shown in the drawings, three auxiliary trails are provided in this construction, two of which are carried permanently by the main trail. Each of these trails comprises a trail body $i$ hinged by one end to an arcuate slide block $i^3$ movable in a guideway of corresponding shape provided in the head $g^1$ of the main trail $g$. The object of making the trail element $i^3$ movable is to permit of the adjustment, on more or less uneven ground, of the support of the rear end of the spade on the said ground. The displacement of the slide block $i^3$ for this adjustment may be effected, as shown in the figures, by means of a nut $i^4$ (Figures 8, 10 and 11) which is integral with $i^3$ and is caused to move forward or backward by turning a screw-threaded rod $g^7$ journalled in the trail head $g^1$. For travelling, the trails $i-i$ are folded against the main trail $g$ by rotating them about their hinges, as shown in Figure 5. The lower converted carriage is completed by an auxiliary trail, arranged in line with the main trail $g$ and provided with a head $j$ which is coupled to the pintle bearing by means of the pin $k$, and to the main trail $g$ by means of the pin $h^1$ (Figures 7 and 8).

Figure 12:
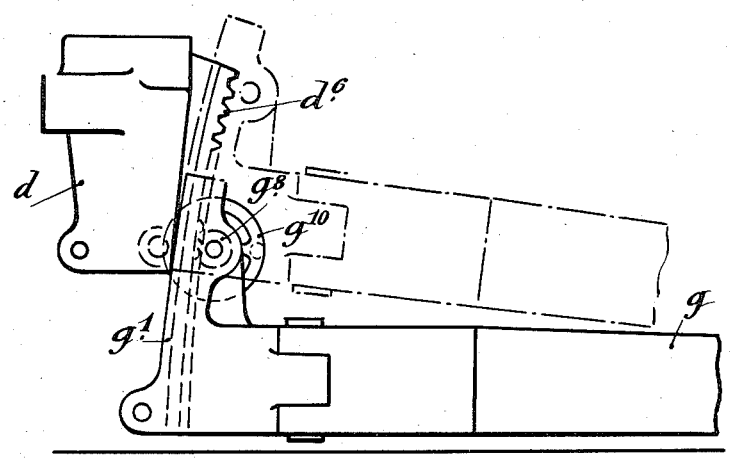
Figures 12 and 13 show in part elevation and plan a modification of the arrangement for the head of the main trail with a view to rendering the lowering thereof possible.
Figure 13:
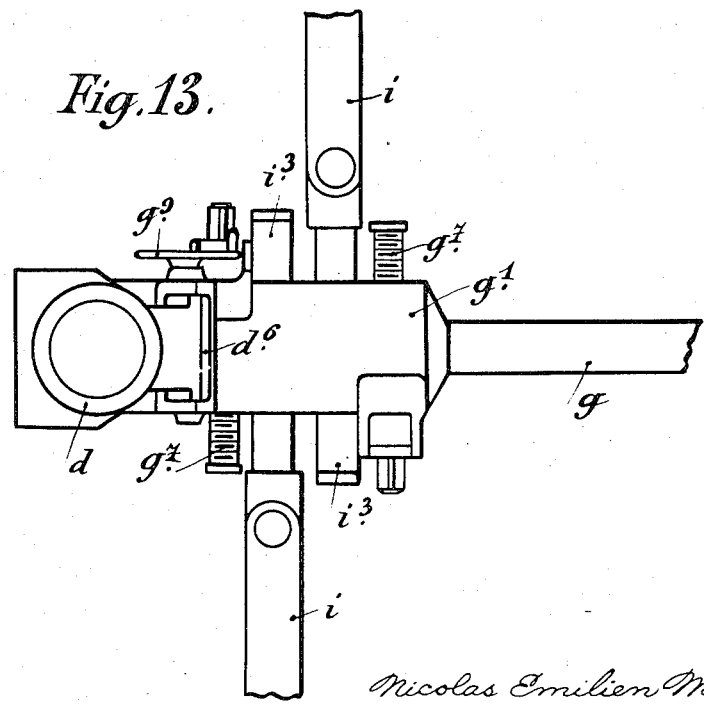

Figures 12 and 13 show a modification of the construction just described. In this modification, the lowering of the main trail $g$, instead of being effected by simply sliding the head $g^1$ on the pintle bearing $d$, is effected by a pinion $g^8$, journalled on the said head, rolling on an arcuate rack $d^6$ formed on a projection on the pintle bearing $d$. The pinion $g^8$ is actuated by means of a hand wheel $g^{10}$. In all other respects, this construction is identical with that shown in Figures 5 to 11.

The construction shown in Figures 14 to 19 inclusive is a modification of that shown in Figures 1 to 4.

In this constructional example, the displacement of the main trail $g$, in its lowering and raising movements, is operated by means of a coupling member between the trail head and the pintle bearing, the said member being permanently hinged to the pintle bearing and to the trail head, and forming so to speak a link between these two elements. In the construction represented, this coupling member is constituted by two side plates $m$ mounted on a pin $d^7$ carried by the pintle bearing, and on the pins $g^9$ carried by the trail head $g^1$ (Figure 17). The side plates $m$ are adapted to be brought as a whole alternatively, into the position they occupy in Figures 14 and 15, and into that they occupy in Figures 16 and 17.

In the position shown in Figures 14 and 15, which is that corresponding to normal firing on wheels, the side plates $m$ are fixed to the trail $g$ by a pin $m^1$, the trail $g$, moreover, being connected to the pintle bearing by pins $d^{11}$.

In order to lower the trail, the pins $d^{11}$ and the pin $m^1$ are disengaged. It is then possible to manipulate the trail $g$, the side plates $m$ turning together about the pivots $d^7$ and $g^9$, and to bring these side plates into the position they occupy in Figures 16 and 17, in which they are fixed to the pintle bearing $d$ by a pin $m^2$ engaging holes $m^3$ in the plates and the corresponding orifices $d^8$ in the pintle bearing. The pin $m^1$, having been previously disengaged, serves to fix the side plates to the trail $g$ by being fitted into the holes $m^4$ of the side plates $m$ and inserted into a corresponding hole in the trail head $g^1$.

The attachment of the auxiliary trails $i$, by means of the head $j$ is effected in exactly the same manner as in the example shown in Figures 1 to 5.

Figures 19 to 21 show another modification of the construction shown in Figures 1 to 5.

In this example, the head $g^1$ of the main trail $g$ is adapted to slide, for lowering or raising, on two diametrically opposite toothed guides $d^3$ in the form of projections on the pintle bearing $d$. Sliding is effected by means of two pinions $g^8$ journalled in the trail head $g^1$ and actuated either by simultaneously manipulated manual means $g^{10}$, as shown in Figure 20, or by means of a single drive and transmission gear terminating at the two pinions. The attachment of the auxiliary trails $i$ by means of the head $j$ is effected in exactly the same manner as in the example shown in Figures 1 to 5.

It should be pointed out that for all these arrangements it is normal to fire in single trail, whether the main trail is in the top position or in the bottom position, the first permitting fire to be opened more rapidly and the second giving a better vertical field of fire.

It should also be noted that in the arrangement indicated in Figures 19, 20, 21, it is only possible to fire with the trail $g$ in the top position, if an inclination of the pivot is allowed.

I claim:

1. In a gun carriage, a pintle bearing, an oscillating gun and cradle pivotally mounted on said bearing, transportation means detachably connected to said bearing, a single main trail having a head secured to said bearing, means for raising and lowering said trail head relative to said bearing from a normal raised position for firing with said transportation means in place to a lowered emplaced position with the transportation means removed for anti-aircraft firing, said means being so constructed and arranged that the movements of said trail are accomplished without affecting the position of the oscillating gun and cradle with respect to the ground and without disconnecting said trail from said bearing, a plurality of auxiliary trails, and means for securing said auxiliary trails to a portion of the gun carriage that is fixed during firing when the main trail is in lowered position, both said main and said auxiliary trails being so located when in emplaced position as to permit said oscillating gun and cradle to pivot freely thereabove for firing at aerial objectives at any altitude and azimuth.

2. In a gun carriage, a pintle bearing, an oscillating gun and cradle pivotally mounted on said bearing, transportation means detachably connected to said bearing, a single main trail leg having a head adapted to be secured to said bearing, means for securing said trail head to said bearing for pivotal movement relative thereto about an axis slightly inclined to the horizontal, whereby said trail leg may be quickly moved, without affecting the position of said oscillating gun and cradle relative to the ground, from a normal raised position for firing with said transportation means in place to a lowered emplaced position with the transportation means removed for anti-aircraft firing, a plurality of auxiliary trails, and means for securing said auxiliary trails to said main trail in spread position when the latter is in lowered position, both said main and said auxiliary trails being so located when in emplaced position as to permit said oscillating gun and cradle to pivot freely thereabove for firing at aerial objectives at any altitude and azimuth.

3. In a gun carriage, a pintle bearing, an oscillating gun and cradle pivotally mounted on said bearing, transportation means detachably connected to said bearing, a single main trail leg having a head adapted to be secured to said bearing and a foot adapted to engage the ground, means for securing said trail head to said bearing for pivotal movement relative thereto about an axis slightly inclined to the horizontal, means for securing said trail foot to said trail leg for pivotal movement about an axis substantially coaxial with said first named axis, whereby said trail leg may be quickly moved, without affecting the position of said oscillating gun and cradle relative to the ground, from a normal raised position for firing with said transportation means in place to a lowered emplaced position with the transportation means removed for anti-aircraft firing, a plurality of auxiliary trails, and means for securing said auxiliary trails to said main trail in spread position when the latter is in lowered position, both said main and said auxiliary trails being so located when in emplaced position as to permit said oscillating gun and cradle to pivot freely thereabove for firing at aerial objectives at any altitude and azimuth.

4. In a gun carriage, a pintle bearing, an oscillating gun and cradle pivotally mounted on said bearing, transportation means detachably connected to said bearing, a single main trail adapted to be secured to said bearing, means for securing said trail to said bearing in a plurality of different positions relative thereto including an intermediate member pivotally mounted on said bearing and a pivotal connection between said intermediate member and said trail, whereby said trail may be quickly moved, without affecting the position of said oscillating gun and cradle relative to the ground, from a normal raised position for firing with said transportation means in place to a lowered emplaced position with the transportation means removed for anti-aircraft firing, a plurality of auxiliary trails, and means for securing said auxiliary trails to said main trail in spread position when the latter is in lowered position, both said main and said auxiliary trails being so located when in emplaced position as to permit said oscillating gun and cradle to pivot freely thereabove for firing at aerial objectives at any altitude and azimuth.

5. In a gun carriage, a pintle bearing, an oscillating gun and cradle pivotally mounted on said bearing, transportation means detachably connected to said bearing, a single main trail adapted to be secured to said bearing, means for securing said trail to said bearing in a plurality of different positions relative thereto including an intermediate link member pivotally mounted on said bearing for movement about a substantially horizontal axis and a pivotal connection between said intermediate member and said trail having its axis substantially parallel to said first named axis, whereby said trail may be quickly moved, without affecting the position of said oscillating gun and cradle relative to the ground, from a normal raised position for firing with said transportation means in place to a lowered emplaced position with the transportation means removed for anti-aircraft firing, a plurality of auxiliary trails, and means for securing said auxiliary trails to said main trail in spread position when the latter is in lowered position, both said main and said auxiliary trails being so located when in emplaced position as to permit said oscillating gun and cradle to pivot freely thereabove for firing at aerial objectives at any altitude and azimuth.

6. In a gun carriage, a pintle bearing, an oscillating gun and cradle pivotally mounted on said bearing, transportation means detachably connected to said bearing, a single main trail adapted to be secured to said bearing, means for securing said trail to said bearing in a plurality of different positions relative thereto including a slide guide carried by said bearing, a trail head secured to said trail and slidably engaging said slide guide and means for maintaining said trail head in a plurality of positions relative to said guide, whereby said trail may be quickly moved, without affecting the position of said oscillating gun and cradle relative to the ground, from a normal raised position for firing with said transportation means in place to a lowered emplaced position with the transportation means removed for anti-aircraft firing, a plurality of auxiliary trails, and means for securing said auxiliary trails to said main trail in spread position when the latter is in lowered position, both said main and said auxiliary trails being so located when in emplaced position as to permit said oscillating gun and cradle to pivot freely thereabove for firing at aerial objectives at any altitude and azimuth.

7. In a gun carriage, a pintle bearing, an oscillating gun and cradle pivotally mounted on said bearing, transportation means detachably connected to said bearing, a single main trail adapted to be secured to said bearing, means for securing said trail to said bearing in a plurality of different positions relative thereto including an arcuate slide guide carried by said bearing and having its center of curvature substantially coincidental with the point of engagement of said trail with the ground, a trail head secured to said trail and slidably engaging said slide guide and means for maintaining said trail head in a plurality of positions relative to said guide, whereby said trail may be quickly moved, without affecting the position of said oscillating gun and cradle relative to the ground, from a normal raised position for firing with said transportation means in place to a lowered emplaced position with the transportation means removed for anti-aircraft firing, a plurality of auxiliary trails, and means for securing said auxiliary trails to said main trail in spread position when the latter is in lowered position, both said main and said auxiliary trails being so located when in emplaced position as to permit said oscillating gun and cradle to pivot freely thereabove for firing at aerial objectives at any altitude and azimuth.

8. In a gun carriage, a pintle bearing, an oscillating gun and cradle pivotally mounted on said bearing, transportation means detachably connected to said bearing, a single main trail adapted to be secured to said bearing, means for securing said trail to said bearing in a plurality of different positions relative thereto including a pair of slide guides carried on opposite sides of said bearing and each provided with teeth constituting a rack and a trail head adapted to engage said guides and carrying a pair of pinions in mesh with said racks, whereby said trail may be quickly moved, without affecting the position of said oscillating gun and cradle relative to the ground, from a normal raised position for firing with said transportation means in place to a lowered emplaced position with the transportation means removed for anti-aircraft firing, a plurality of auxiliary trails, and means for securing said auxiliary trails to said main trail in spread position when the latter is in lowered position, both said main and said auxiliary trails being so located when in emplaced position as to permit said oscillating gun and cradle to pivot freely thereabove for firing at aerial objectives at any altitude or azimuth.

9. In a gun carriage, a pintle bearing, an oscillating gun and cradle pivotally mounted on said bearing, transportation means detachably connected to said bearing, a single main trail having a head secured to said bearing, means for raising and lowering said trail head relative to said bearing from a normal raised position for firing with said transportation means in place to a lowered emplaced position with the transportation means removed for anti-aircraft firing, said means being so constructed and arranged that the movements of said trail are accomplished without affecting the position of the oscillating gun and cradle with respect to the ground and without disconnecting said trail from said bearing, and a plurality of auxiliary trails connected to a portion of the gun carriage that is fixed during firing for movement about substantially vertical axes to and from a spread emplaced position when said main trail is in lowered position, all of said trails being so located when in emplaced position as to permit said oscillating gun and cradle to pivot freely thereabove for firing at aerial objectives at any altitude and azimuth.

10. In a gun carriage, a pintle bearing, an oscillating gun and cradle pivotally mounted on said bearing, transportation means detachably connected to said bearing, a single main trail having a head secured to said bearing, means for raising and lowering said trail head relative to said bearing, without affecting the position of said oscillating gun and cradle relative to the ground, from a normal raised position for firing with said transportation means in place to a lowered emplaced position with the transportation means removed for anti-aircraft firing, a plurality of auxiliary trails connected to said main trail for movement about substantially vertical axes to and from a spread emplaced position with respect to said main trail when the latter is in lowered position, and another auxiliary trail adapted to be detachably connected to said main trail to extend substantially collinearly therewith and in the opposite direction from said bearing, all of said trails being so located when in emplaced position as to permit said oscillating gun and cradle to pivot freely thereabove for firing at aerial objectives at any altitude and azimuth.

11. In a gun carriage, a pintle bearing, an oscillating gun and cradle pivotally mounted on said bearing, transportation means detachably connected to said bearing, a single main trail having a head secured to said bearing, means for raising and lowering said trail head relative to said bearing, without affecting the position of said oscillating gun and cradle relative to the ground, from a normal raised position for firing with said transportation means in place to a lowered emplaced position with the transportation means removed for anti-aircraft firing, a plurality of auxiliary trails permanently connected to said main trail for movement about substantially vertical axes to and from a spread emplaced position substantially at right angles to said main trail when the latter is in lowered position, and another auxiliary trail adapted to be detachably connected to both said main trail and said bearing to extend substantially collinearly with said main trail and in the opposite direction from said bearing, whereby a substantially cross-shaped emplacement is provided, all of said trails being so located when in emplaced position as to permit said oscillating gun and cradle to pivot freely thereabove for firing at aerial objectives at any altitude or azimuth.

12. In a gun carriage, a pintle bearing, an oscillating gun and cradle pivotally mounted on said bearing, transportation means detachably connected to said bearing, a single main trail leg having a head secured to said bearing, means for raising and lowering said head relative to said bearing, without affecting the position of said oscillating gun and cradle relative to the ground, from a normal raised position for firing with said transportation means in place to a lowered emplaced position with the transportation means removed for anti-aircraft firing, and a plurality of auxiliary trails carried by and pivotally mounted with respect to said main trail head for movement to and from a spread emplaced position when said head is in lowered position, all of said trails being so located when in emplaced position as to permit said oscillating gun and cradle to pivot freely thereabove for firing at aerial objectives at any altitude and azimuth.

13. In a gun carriage, a pintle bearing, an oscillating gun and cradle pivotally mounted on said bearing, transportation means detachably connected to said bearing, a single main trail leg having a head secured to said bearing, means for raising and lowering said head relative to said bearing, without affecting the position of said oscillating gun and cradle relative to the ground, from a normal raised position for firing with said transportation means in place to a lowered emplaced position with the transportation means removed for anti-aircraft firing, a plurality of members carried by and slidably displaceable transversely to said main trail head, and an auxiliary trail pivotally connected to each of said members for movement to and from a spread emplaced position with respect to said main trail when the latter is in lowered position, all of said trails being so located when in emplaced position as to permit said oscillating gun and cradle to pivot freely thereabove for firing at aerial objectives at any altitude and azimuth.

14. In a gun carriage, a pintle bearing, an oscillating gun and cradle pivotally mounted on said bearing, transportation means detachably connected to said bearing, a single main trail leg having a head secured to said bearing, means for raising and lowering said head relative to said bearing, without affecting the position of said oscillating gun and cradle relative to the ground, from a normal raised position for firing with said transportation means in place to a lowered emplaced position with the transportation means removed for anti-aircraft firing, a plurality of members carried by and slidably displaceable transversely to said main trail head, an auxiliary trail pivotally connected to each of said members for movement to and from a spread emplaced position substantially at right angles to said main trail when the latter is in lowered position, and another auxiliary trail adapted to be detachably connected to both said main trail head and said bearing to extend substantially collinearly with said main trail and in the opposite direction from said bearing, all of said trails being so located when in emplaced position as to permit said oscillating gun and cradle to pivot freely thereabove for firing at aerial objectives at any altitude and azimuth.

15. In a gun carriage, a pintle bearing, an oscillating gun and cradle pivotally mounted on said bearing, transportation means detachably connected to said bearing, a single main trail leg having a head secured to said bearing, means for raising and lowering said head relative to said bearing, without affecting the position of said oscillating gun and cradle relative to the ground, from a normal raised position for firing with said transportation means in place to a lowered emplaced position with the transportation means removed for anti-aircraft firing, a plurality of arcuate members carried by and extending transversely to said main trail head, an auxiliary trail pivotally connected to each of said members for movement to and from a spread emplaced position with respect to said main trail when the latter is in lowered position, and means for moving said arcuate members transversely with respect to said trail head to adjust the position of said auxiliary trail feet when in spread position, all of said trails being so located when in emplaced position as to permit said oscillating gun and cradle to pivot freely thereabove for firing at aerial objectives at any altitude and azimuth.

16. In a gun carriage, a pintle bearing, an oscillating gun and cradle pivotally mounted on said bearing, transportation means detachably connected to said bearing, a single main trail leg having a head secured to said bearing, means for raising and lowering said head relative to said bearing, without affecting the position of said oscillating gun and cradle relative to the ground, from a normal raised position for firing with said transportation means in place to a lowered emplaced position with the transportation means removed for anti-aircraft firing, a plurality of arcuate members carried by and extending transversely to said main trail head, an auxiliary trail pivotally connected to each of said members for movement to and from a spread emplaced position with respect to said main trail when the latter is in lowered position, means for individually displacing each of said arcuate members transversely with respect to said trail head to adjust the position of said auxiliary trail feet when in spread position, and another auxiliary trail adapted to be detachably connected to said main trail head to extend on the opposite side of said bearing therefrom, all of said trails being so located when in emplaced position as to permit said oscillating gun and cradle to pivot freely thereabove for firing at aerial objectives at any altitude and azimuth.

17. In a gun carriage of the type embodying a pintle bearing, an oscillating gun and cradle, a main trail and transportation means detachably secured to said bearing, an auxiliary trail structure adapted to be detachably secured to said main trail and bearing when the gun is in emplaced position for firing at aerial objectives comprising an auxiliary trail head, means for detachably securing said head to both said bearing and said main trail, and a plurality of auxiliary trail legs pivotally secured to said head and adapted to be spread apart to anchor the gun carriage when in position for anti-aircraft firing.

18. In a gun carriage of the type embodying a pintle bearing, an oscillating gun and cradle, a main trail and transportation means detachably secured to said bearing, an auxiliary trail structure adapted to be detachably secured to said main trail and bearing when the gun is in emplaced position for firing at aerial objectives comprising an auxiliary trail head, means for detachably securing said head to both said bearing and said main trail, a plurality of auxiliary trail legs pivotally secured to said head and adapted to be spread apart to anchor the gun carriage when in position for anti-aircraft firing, and means for fixing said auxiliary trail legs with respect to said head when the former are in spread position.

NICOLAS EMILIEN METHLIN.